United States Patent
Lin et al.

(10) Patent No.: US 8,534,565 B2
(45) Date of Patent: Sep. 17, 2013

(54) TWO-DIMENSIONAL OPTICAL IDENTIFICATION DEVICE WITH SAME GRAY LEVEL FOR QUICK DECODING AND DECODING METHOD THEREFOR

(75) Inventors: Shih-Chien Lin, Miaoli (TW); Yu-Hsun Wang, Kaohsiung (TW)

(73) Assignee: Generalplus Technology Inc. (TW)

( * ) Notice: Subject to any disclaimer, the term of this patent is extended or adjusted under 35 U.S.C. 154(b) by 65 days.

(21) Appl. No.: 13/290,273

(22) Filed: Nov. 7, 2011

(65) Prior Publication Data

US 2012/0298754 A1   Nov. 29, 2012

(30) Foreign Application Priority Data

May 25, 2011  (TW) .............................. 100118251 A

(51) Int. Cl.
*G06K 19/06* (2006.01)
(52) U.S. Cl.
USPC ................... 235/494; 235/462.01; 235/462.09
(58) Field of Classification Search
USPC ........................................ 235/462.01–462.09
See application file for complete search history.

(56) References Cited

U.S. PATENT DOCUMENTS

| | | | | |
|---|---|---|---|---|
| 7,424,975 B2* | 9/2008 | Cordery et al. | ........... | 235/462.09 |
| 7,530,496 B2* | 5/2009 | Chen | .............................. | 235/454 |
| 7,770,803 B2* | 8/2010 | Onishi | ......................... | 235/494 |
| 7,942,341 B2* | 5/2011 | Ao et al. | ........................ | 235/494 |
| 2007/0023523 A1* | 2/2007 | Onishi | ......................... | 235/454 |
| 2007/0246547 A1* | 10/2007 | Tsai et al. | ..................... | 235/494 |
| 2012/0298761 A1* | 11/2012 | Lin et al. | ....................... | 235/494 |

\* cited by examiner

*Primary Examiner* — Christle Marshall
(74) *Attorney, Agent, or Firm* — Bacon & Thomas, PLLC

(57) ABSTRACT

A two-dimensional optical identification device for a quick decoding operation in a same gray level and decoding method applied to the same. The two-dimensional optical identification device has at least one two-dimensional optical identification with the same gray level. The two-dimensional optical identification has a first positioning block, a plurality of data blocks, and a second positioning block. The first positioning block has a plurality of first positioning points. The data blocks are placed around the first positioning block. The second positioning block has a plurality of second positioning points and a second direction identification point for providing the direction of the two-dimensional optical identification, and the second positioning block is placed at each boundary of the plurality of data blocks for defining the positions of the plurality of data blocks. The second direction identification point indicates an identification direction of the two-dimensional optical identification.

10 Claims, 7 Drawing Sheets

TWO-DIMENSIONAL OPTICAL IDENTIFICATION DEVICE WITH SAME GRAY LEVEL FOR QUICK DECODING AND DECODING METHOD THEREFOR

CROSS REFERENCE TO RELATED APPLICATION

This application claims the benefits of the Taiwan Patent Application Serial Number 100118251, filed on May 25, 2011, the subject matter of which is incorporated herein by reference.

BACKGROUND OF THE INVENTION

1. Field of the Invention

The present invention relates to the technical field of two-dimensional optical identification and, more particularly, to a two-dimensional optical identification device with same gray level for quick decoding and decoding method therefor.

2. Description of Related Art

For increasing the convenience, fun, and efficiency of reading a document, a typical way embeds optical identification codes into pictures in which the optical identification codes are printed on the document. An external reader can thus read the optical identification code corresponding to a part of pictures, and activate an output device to, for example, play a voice based on the read optical identification code. Thus, the played voice can effectively help the reading. However, such a technique has to embed the optical identification code into the pictures of the document, which certainly causes the complexity of making a document and affects the picture display. Therefore, it is desired to accurately read the optical identification code without being affected by the pictures.

In the known patents, U.S. Pat. No. 7,530,496 granted to Chen for a "Surface sensitive input device with indexes and computer system using the input device" discloses a layer of points corresponding to an optical identification code added onto a raw image, as show in FIG. 1. The optical identification code 100 of FIG. 1 has a plurality of indexing points in an isotropic arrangement. The indexing points are tiny and thus invisible to human eyes. As shown in FIG. 1, such indexing points are arranged in an isotropic manner, each indexing point having a radius of about 100 µm. The indexing points include a center point 110, a plurality of direction points 121 and 122, a plurality of first data points 131-136, and a plurality of second data points 1401-1412. The direction point 122 is provided as a direction recognition point in blank or hollow, in which the hollow direction point 122 is used to represent no point printed.

Such an optical identification code 100 can present a different picture object which can be read by an optical reader for further processing. For example, different optical identification codes representing different picture objects correspond to different voices, respectively, and accordingly a corresponding voice can be played when the optical reader reads a picture object.

However, as shown in the optical identification code 100 of FIG. 1, the locations of the first data points 131-136 and the second data points 1401-1412 at the outer circle are determined by using the center point 110, a direction point 121 and five direction points 122. Since there is no auxiliary positioning point on the outer circle, it is possible to have a deformed picture taken by a slant lens, which further increases the difficulty of locating the data points.

FIG. 2 schematically illustrates another optical identification code 200. The optical identification code 200 is comprised of one positioning block 201 and eight coded data blocks 202-209 arranged in a nine-square grid. Each center of the coded data blocks 202-209 is filled up and used as an auxiliary positioning point to thereby avoid the difficulty on locating the data points due to lack of auxiliary positioning point on the outer. The positioning block 201 has five points filled up and used as major positioning points to reduce the difficulty of locating the data points. However, the major positioning points of the block 201 are obvious to see, in which users can easily sense a texture when the optical identification codes 200 repeatedly present on the surface of a picture. In addition, the auxiliary positioning points and data points contained in the coded data blocks 202-209 can cause a non-uniform distribution of the data points, resulting in producing the effect of non-uniform gray level.

FIG. 3 schematically illustrates another optical identification code 300. The optical identification code 300 is comprised of a content part 310 and a position part 320. The content part 310 has nine coded data blocks, and the position part 320 has seven positioning blocks. The position part 320 is arranged at two adjacent sides of the content part 310. In this case, in order to improve the equality effect of gray level, all positioning points are arranged at the outer with a shifted point 321 to indicate the direction information. However, for the same gray level, all data points 311 are placed in proximity to an intersection of virtual lines 313 and 315, with a small offset. In addition, a desired pitch between pictures is added in the coded data blocks. Thus, the amount of coded data is relatively small when the optical identification code is shrunk. In contrast, the patterns are not in the same gray level due to the smaller pitch produced when the amount of coded data is increased, as well as the decoding difficulty is increased.

Therefore, it is desirable to provide an improved optical identification device and decoding method to mitigate and/or obviate the aforementioned problems.

SUMMARY OF THE INVENTION

The object of the present invention is to provide a two-dimensional optical identification device with same gray level for quick decoding and decoding method therefor, which can improve the equality effect of gray level and allow printing larger points to reduce the print requirement, so as to increase the recognition accuracy on reading a slant code thereby increasing the decoding speed.

In accordance with one aspect of the invention, there is provided a two-dimensional optical identification device with same gray level for quick decoding, on which at least one two-dimensional optical identification code with same gray level is arranged. The two-dimensional optical identification code comprises: a first positioning block having a plurality of first positioning points; a plurality of data blocks placed around the first positioning block, each of the data blocks having a plurality of defined patterns, each defined pattern being selectively positioned in one of a plurality of virtual areas produced by equally dividing the data block; and a second positioning block having a plurality of second positioning points placed at two adjacent boundaries of the plurality of data blocks for defining positions of the plurality of data blocks, wherein one of the second positioning points is defined as a second direction identification point which indicates an identification direction of the two-dimensional optical identification code.

In accordance with another aspect of the invention, there is provided a decoding method for quickly decoding two-dimensional optical identification code with same gray level, the two-dimensional optical identification code including a first positioning block, a plurality of data blocks, and a second positioning block, the first positioning block having a plurality of first positioning points, the plurality of data blocks being placed around the first positioning block, each of the data blocks having a plurality of defined patterns selectively positioned in one of a plurality of virtual areas produced by equally dividing the data block, the second positioning block having a plurality second positioning points and being placed at two adjacent boundaries of the plurality of data blocks for defining distributed locations of the data blocks. The method comprises the steps of: (A) finding the plurality of first positioning points of the first positioning block; (B) calculating the plurality of second positioning points of the second positioning block based on the plurality of first positioning points; (C) recognizing a second direction identification point among the plurality of second positioning points; (D) determining an identification direction of the optical identification code with same gray level, and storing coordinates of the first and second positioning points; (E) finding any first positioning block that includes the first positioning points; (F) searching for a plurality of data blocks on the first positioning block found in step (E), so as to find an area with complete plurality of data blocks and corresponding first positioning block; (G) calculating offsets of defined patterns of the complete plurality of data blocks in the area found in step (F); (H) regarding the corresponding first positioning block as illegal when an offset is greater than a threshold; and (I) outputting data corresponding to a smallest offset of the defined patterns when the offsets of the defined patterns are smaller than or equal to the threshold.

Other objects, advantages, and novel features of the invention will become more apparent from the following detailed description when taken in conjunction with the accompanying drawings.

DETAILED DESCRIPTION OF THE PREFERRED EMBODIMENT

Figure 4:
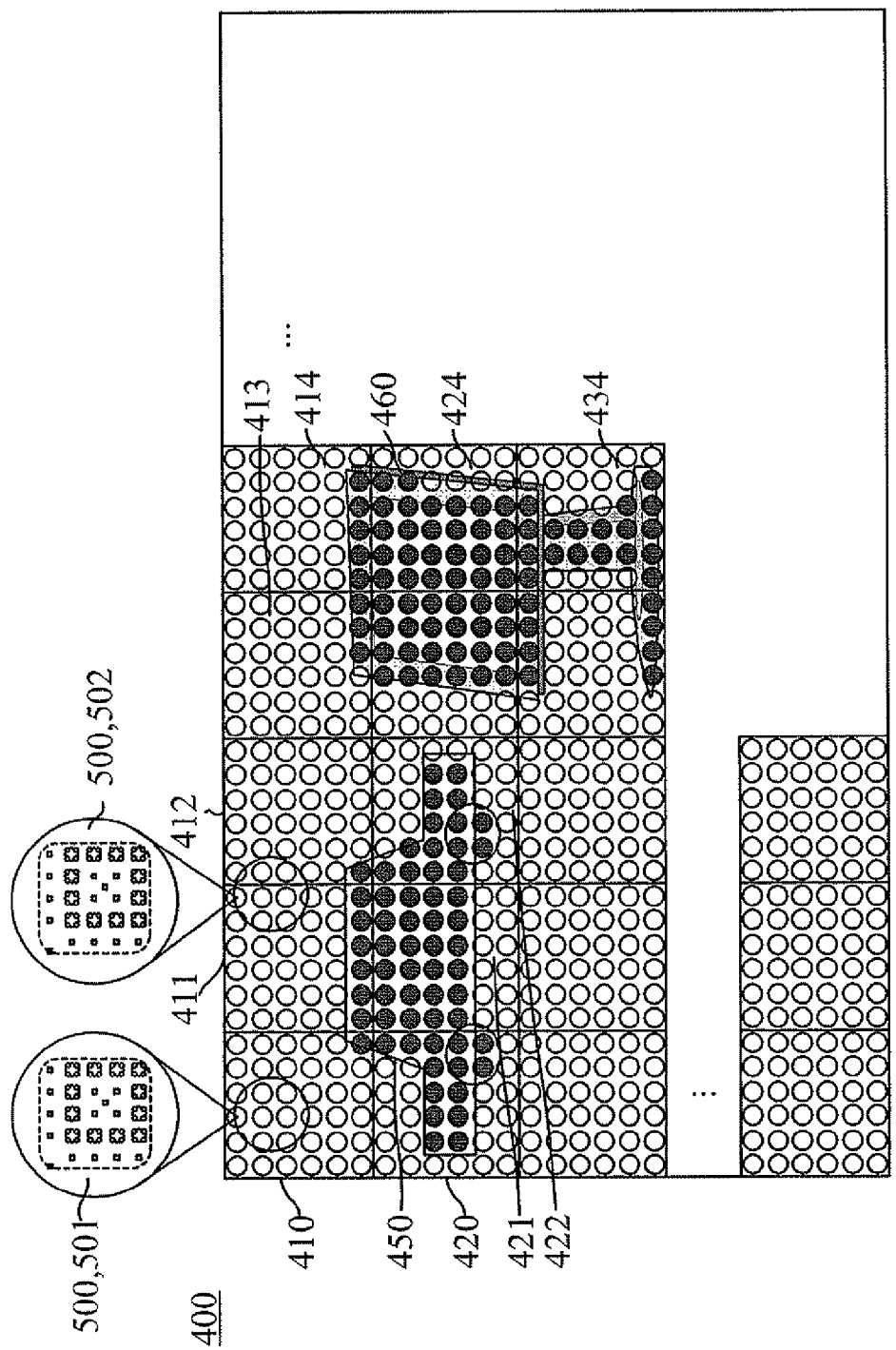
FIG. 4 schematically illustrates a two-dimensional optical identification device with same gray level for quick decoding in accordance with an embodiment of the invention.

FIG. 4 schematically illustrates a two-dimensional optical identification device with same gray level for quick decoding in accordance with an embodiment of the invention. As shown in FIG. 4, the device 400 is partitioned into a plurality of areas, such as 410, 411, 434, and the like, each having the same size and having a plurality of two-dimensional optical identification codes 500 with same gray level to represent a corresponding value. For example, the optical identifications 501 and 502 represent values of areas 410 and 411 respectively. The device 400 includes two picture objects 450 and 460, where the object 450 covers areas 410, 411, 412, 420, 421, 422, and the object 460 covers areas 413, 414, 423, 424, 433, 434.

Figure 5:
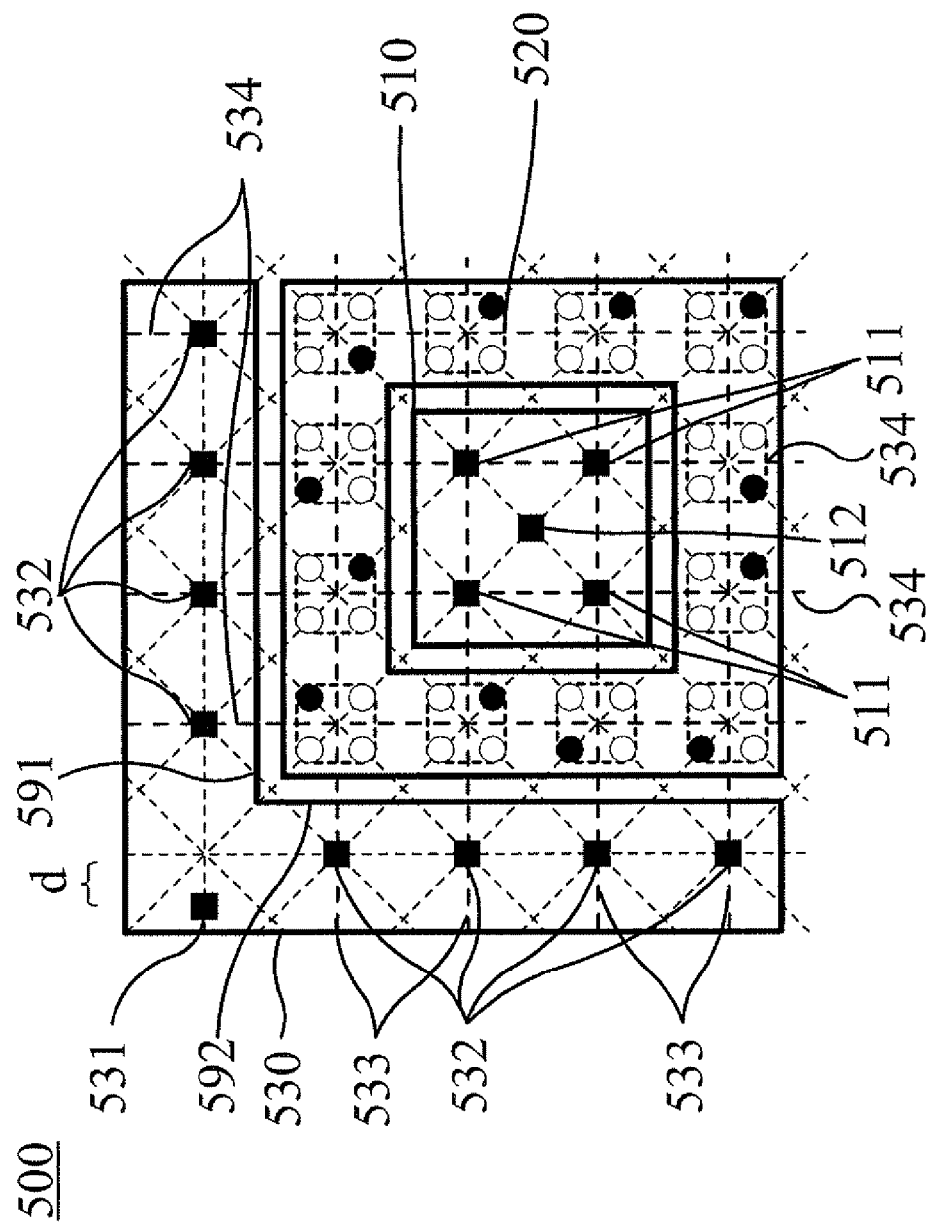
FIG. 5 schematically illustrates a two-dimensional optical identifier in a same gray level in accordance with an embodiment of the invention.

FIG. 5 schematically shows a two-dimensional optical identification code 500 with same gray level in accordance with an embodiment of the invention. The two-dimensional optical identification code 500 includes a first positioning block 510, a plurality of data blocks 520, and a second positioning block 530.

The first positioning block 510 has a plurality of first positioning points 511, 512 for quickly detecting the patterns of the two-dimensional optical identification code 500.

The data blocks 520 are placed around the first positioning block 510. Each of the data blocks 520 has a plurality of defined patterns selectively located in one of virtual areas produced by equally dividing the data block 520.

The second positioning block 530 has a plurality of second positioning points 531, 532 placed at two adjacent boundaries 591, 592 of the data blocks for defining the positions of the data blocks.

In this embodiment, the number of first positioning points 511, 512 is five, but not limited to it. For example, in other embodiments, it can be three or four points. One of the second positioning points 531,532 is defined as a second direction identification point 531 to indicate the identification direction of the two-dimensional optical identification code 500.

As shown in FIG. 5, the first positioning block 510 includes five first positioning points 511, 512, wherein four first positioning points 511 are distributed on four corners of a virtual square (i.e., formed with the four first positioning points 511) while the other first positioning point 512 is located at the center of the virtual square.

In addition, the second positioning block 520 includes N second positioning points 532 and the second direction identification point 531. The N second positioning points 532 form an L shape, and the second direction identification point 531 is located on a position with a first offset d from the intersection of two lines of the L shape, where N is a positive integer and, in this embodiment, N=8.

In the N second positioning points, I second positioning points are used to define I first-direction virtual lines 533, and J second positioning points are used to define J second-direction virtual lines 534. The I first-direction virtual lines 533 are vertical to the J second-direction virtual lines 534. The center of each data block 520 is located at the intersection of a first-direction virtual line 533 and a second-direction virtual line 534, where I, J are positive integers, and I+J=N. In this embodiment, when N=8, I=4 and J=4. In other embodiments, N may be 9 so as to have I=5 and J=4, and so on, which can be easily achieved by those skilled in the art, and thus a detailed description is deemed unnecessary.

Figure 6:
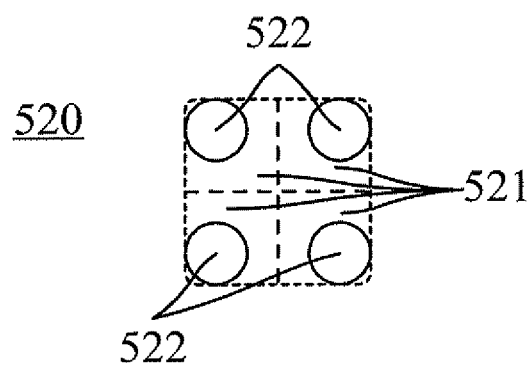
FIG. 6 schematically illustrates an enlarged data block in accordance with an embodiment of the invention.

As shown in FIG. 5, each data block 520 is partitioned into a plurality of virtual areas 521 by a first-direction virtual line 533 and a second-direction virtual line 534. FIG. 6 schematically illustrates an enlarged data block 520 in accordance with an embodiment of the invention. In this embodiment, the number of virtual areas 521 is four.

Each data block 520 has four defined patterns 522 respectively located in the four virtual areas 521. In each data block 520, only one of the four defined patterns 522 is filled up to thereby indicate a two-bit binary code including 00, 01, 10, and 11. The defined pattern can be a circle and/or square.

Figure 7:
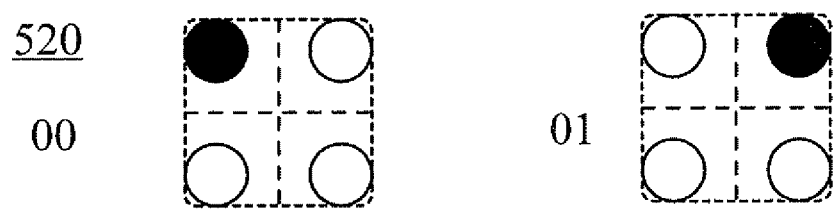
FIG. 7 schematically illustrates coded data blocks in accordance with an embodiment of the invention.
Figure 7:
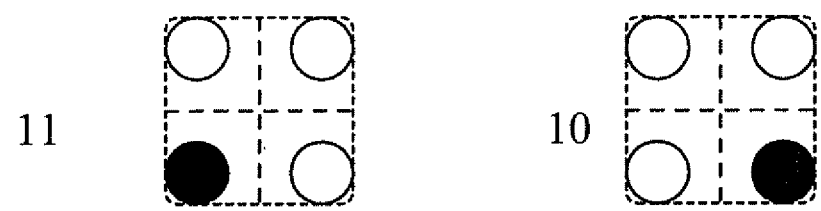

FIG. 7 schematically illustrates the coded data blocks in accordance with an embodiment of the invention. When the defined pattern 522 of the virtual area 521 on the upper left corner of a data block 520 is filled up, it indicates a two-bit binary code of 00. When the defined pattern 522 of the virtual area 521 on the upper right corner of a data block 520 is filled up, it indicates a two-bit binary code of 01. When the defined pattern 522 of the virtual area 521 on the lower right corner of a data block 520 is filled up, it indicates a two-bit binary code of 10. When the defined pattern 522 of the virtual area 521 on the lower left corner of a data block 520 is filled up, it indicates a two-bit binary code of 11.

Figure 8:
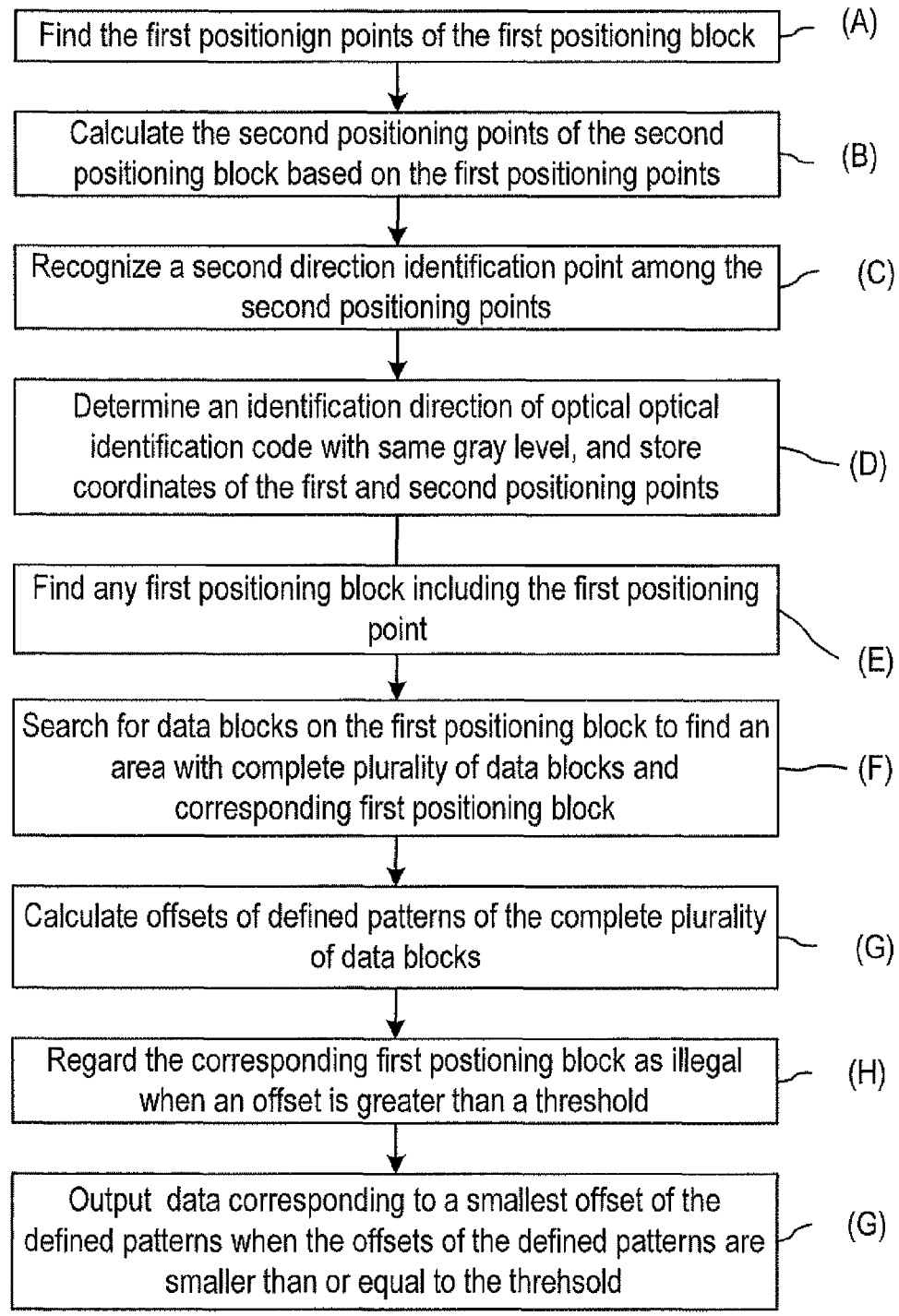
FIG. 8 is a flowchart of a decoding method applied to two-dimensional optical identification code with same gray level for quick decoding in accordance with an embodiment of the invention.

FIG. 8 is the flowchart for a decoding method for quickly decoding two-dimensional optical identification code with same gray level in accordance with an embodiment of the invention. As cited above, the two-dimensional optical identification code 500 has a first positioning block 510, a plurality of data blocks 520, and a second positioning block 530. The first positioning block 510 has a plurality of first positioning points 511, 512 for providing the patterns of the two-dimensional optical identification code. The plurality of data blocks 520 are placed around the first positioning block 510. Each of the data blocks 520 has a plurality of defined patterns 522. Each defined pattern 522 is selectively positioned in one of virtual areas 521 produced by equally dividing the data block 520. The second positioning block 530 has a plurality of second positioning points 531, 532 placed at two adjacent boundaries 591, 592 of the data blocks 520 for defining the positions of the data blocks 520.

Figure 9:
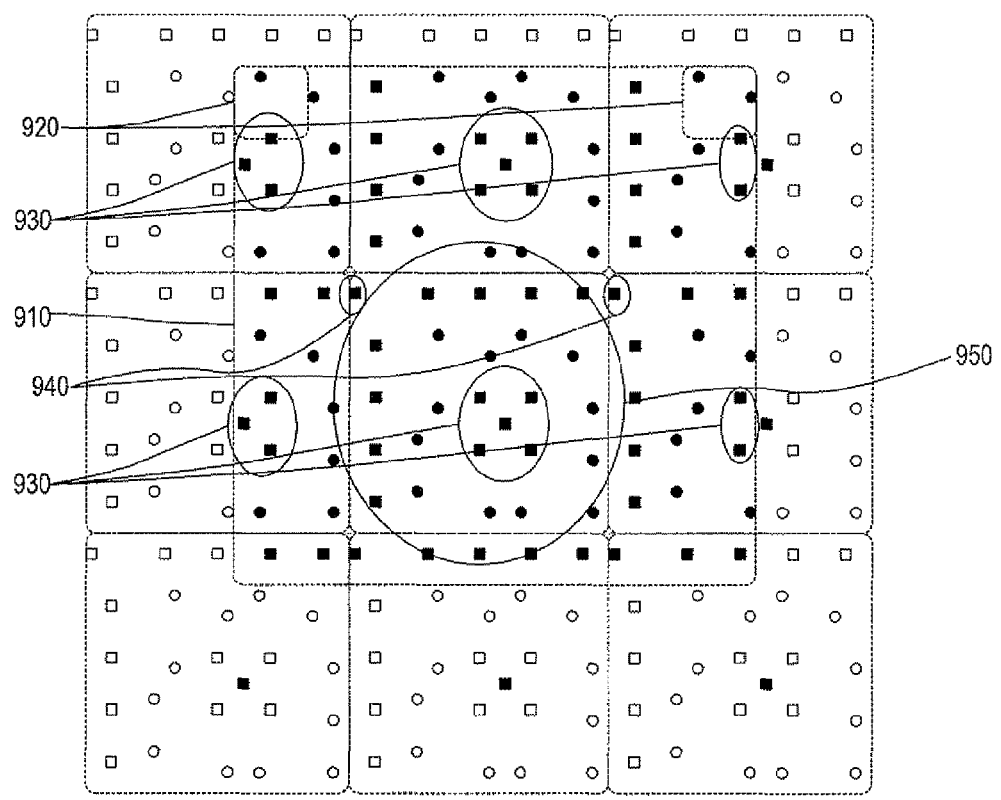
FIG. 9 schematically illustrates a picture with two-dimensional optical identification code with same gray level in accordance with the invention.

The decoding method can use an optical reader to scan the two-dimensional optical identification device 400 to capture the picture of multiple two-dimensional optical identification codes 500 from the device 400. FIG. 9 schematically illustrates the picture of two-dimensional optical identification codes with same gray level in accordance with the invention. As shown in FIG. 9, in order to reduce the cost, the size of the picture captured by the optical reader is typically about four times the size of one two-dimensional optical identification code 500. The captured picture is indicated by the dotted frame 910.

With reference to FIGS. 5, 8 and 9, for a decoding operation, step (A) first finds the first positioning points of the first positioning block in the captured picture. Because of the distance between two of the first positioning points 511, 512 being fixed, the four first positioning points 511 being located on the four corners of a virtual square, and the first positioning point 512 being located on the center of the virtual square, it is applicable to use the size of frame 920 to capture pixels of the picture for determining whether the pixels in the frame 920 contain the first positioning points 511, 512. When the pixels in the frame 920 do not contain the first positioning points 511, 512, the frame 920 is shifted right one pixel each time for performing the determining operation. When being shifted to the rightmost side, the frame 920 is shifted to a pixel in a next row at the leftmost side for repeatedly performing the determining operation, until all pixels in the frame 910 are determined. Thus, in step (A), a plurality of first positioning points 511, 512 indicated by the oval 930 can be searched out.

In step (B), since the relative location between the first positioning block 510 and the second positioning block 530 is known, the second positioning points 531, 532 of the second positioning block 530 can be calculated based on the first positioning points 511, 512 in step (A).

Step (C) recognizes a second direction identification point 531 among the second positioning points 531, 532. Only the second direction identification points 531 indicated by the oval 940 can be recognized in the captured picture of the frame 910 because other two-dimensional optical identification codes with same gray level are not located in the frame 910.

Step (D) determines an identification direction of the optical identification code of the two-dimensional optical identification device with same gray level based on the second direction identification point 531, and stores coordinates of the first positioning points 511, 512 and coordinates of the second positioning points 531, 532.

Step (E) finds any first positioning block 510 that includes the first positioning points 511 stored in step (D).

Step (F) performs a searching operation for a plurality of data blocks on the first positioning block found in step (E), so as to find an area with complete data blocks 520 and corresponding first positioning block 510. In this case, only the two-dimensional optical identification code 500 indicated by the oval 950 has the complete data blocks 520.

Step (G) calculates offsets of the defined patterns 522 of the complete data blocks in the area found in step (F).

In step (H), since the defined patterns 522 are located near the intersections of the first and second direction virtual lines 533, 534, it is regarded as inaccurate positioning if an offset is greater than a threshold, so that the corresponding first positioning block is regarded as illegal.

In step (I), a data corresponding to a smallest offset of the defined patterns is outputted when the offsets of the defined patterns are smaller than or equal to the threshold.

Figure 1:
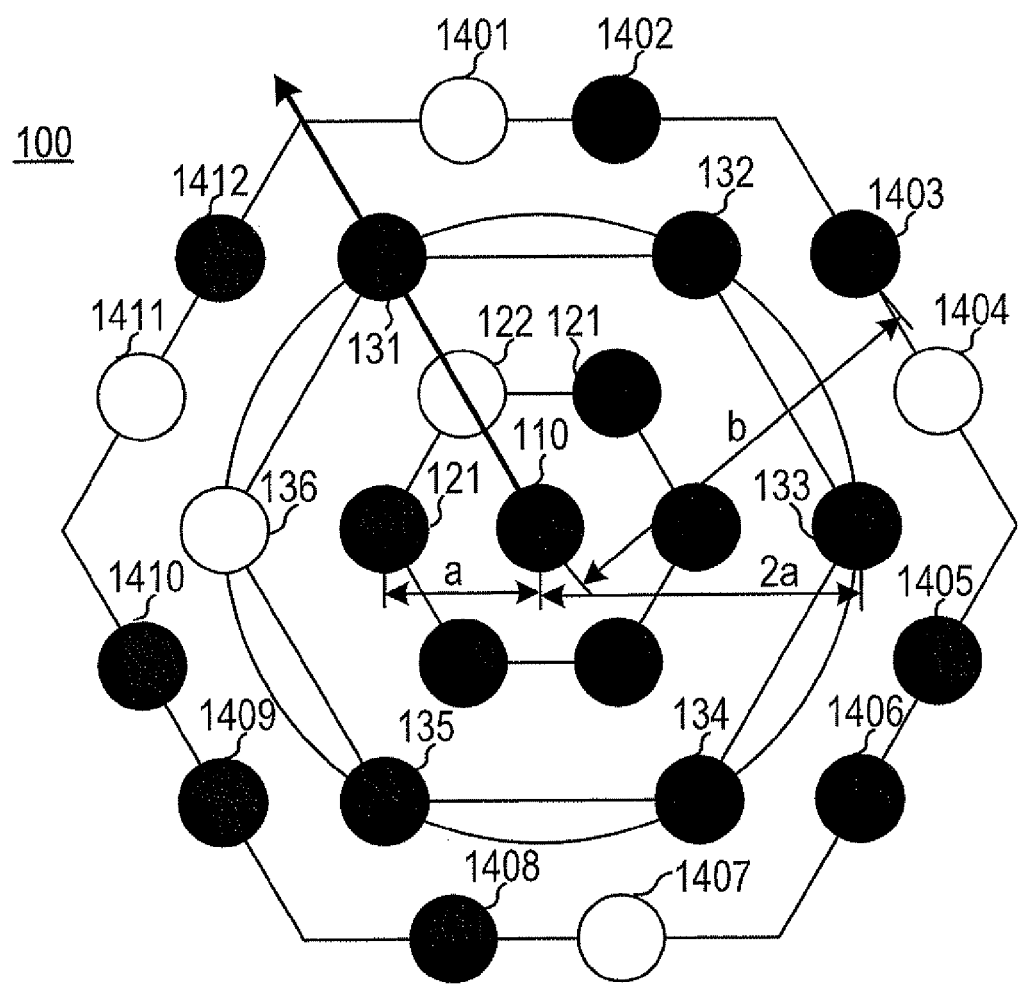
FIG. 1 schematically illustrates a typical optical identification code.
Figure 2:
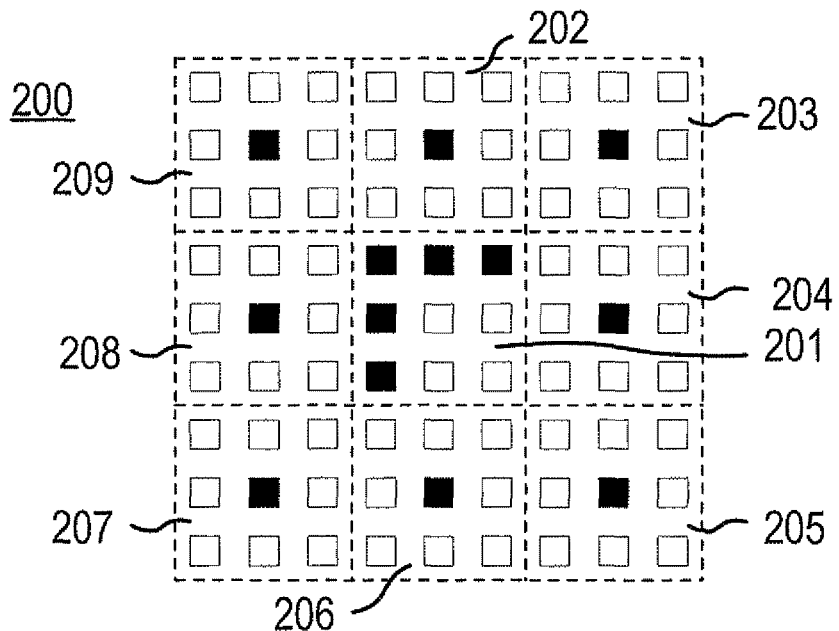
FIG. 2 schematically illustrates another typical optical identification code.

As cited, the two-dimensional optical identification code of the invention present has the essential positioning points 511, 512 located in the inner part, and the positioning points 511, 512 are not as obviousness as those in FIG. 2. In addition, the data points 522 and the positioning points 511, 512, 531, 532 are placed in different blocks for being separated by a blank. Accordingly, all code points (data and positioning points) in a frame are distributed in high uniformity, so as to significantly improve the equality effect of gray level.

The data points of the two-dimensional optical identification code 500 are embraced by the positioning points 511, 512 in the inner part and the positioning points 531, 532 in the outer part. An interpolation can be applied to the positioning points 511, 512 in the inner part and the positioning points 531, 532 in the outer part so as to find the positions of the data points 522. Such an interpolation can increase the precision of data searching and the recognition accuracy on reading a slant code.

As compared with FIG. 2, the data points 522 and the positioning points 511, 512, 531, 532 in the invention are placed in different blocks in order to reduce the density of code points per area and allow the larger print points at the same area ratio, so as to reduce the print requirement.

Figure 3:
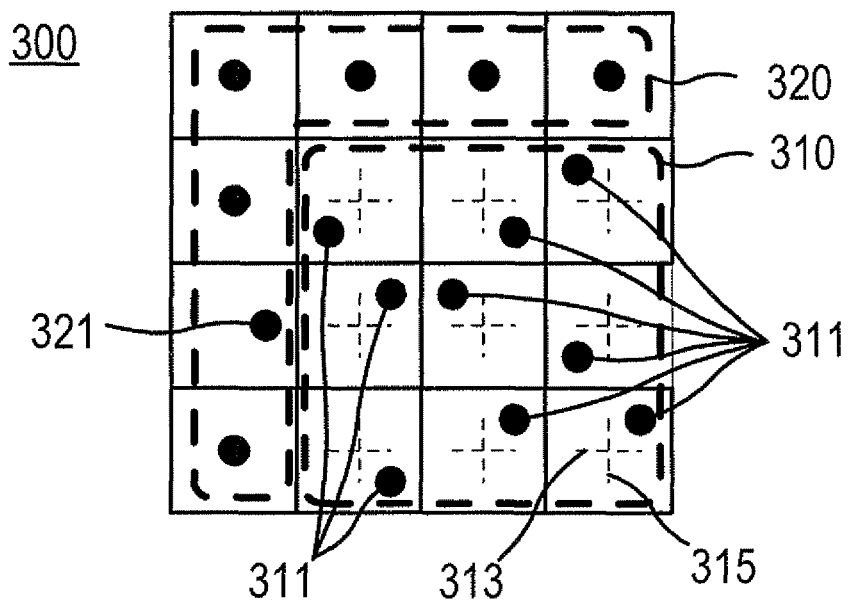
FIG. 3 schematically illustrates still another typical optical identification code.

The essential positioning patterns are located in the first positioning block 510 in the inner part and have significant features, so that they can be quickly found even the pitch between the code points becomes smaller or the code points are slant. Further, the found patterns in the inner are combined with the positioning points of the second positioning block 530 in the outer to thereby ensure whether the code pattern is desired. In contrast, the code pattern of FIG. 3 contains the positioning pattern only in the outer part and is based on an offset of one code point 321 to determine the direction information only, resulting in increase of difficulty in positioning search. Namely, the prior art in FIG. 3 places the positioning pattern in the outer part to overcome the equality problem of gray level, which causes the non-clear pattern feature and increases the difficulty of searching the positioning points when the code pitch is small and/or the slant angle is large, resulting in reducing the accuracy.

Therefore, the positioning points in the invention are placed in the inner part and outer part, and the feature of the positioning pattern in the inner part is significant without affecting the gray level. Even with a small code pitch and large slant angle, the decoding is effectively performed. Since the positioning pattern or patterns in the inner part is clear and can be obtained quickly from the code pattern, the decoding speed is increased.

Although the present invention has been explained in relation to its preferred embodiment, it is to be understood that many other possible modifications and variations can be made without departing from the spirit and scope of the invention as hereinafter claimed.

What is claimed is:

1. A two-dimensional optical identification device for quick decoding, on which at least one two-dimensional optical identification code is arranged, the two-dimensional optical identification code comprising:
    a first positioning block having a plurality of first positioning points, and the plurality of first positioning points including five first positioning points, in which four first positioning points are located on four corners of a virtual square and one first positioning point is located on a center of the virtual square;
    a plurality of data blocks placed around the first positioning block, each of the data blocks having a plurality of defined patterns, each defined pattern being selectively positioned in one of a plurality of virtual areas produced by equally dividing the data block; and
    a second positioning block having a plurality of second positioning points placed at two adjacent boundaries of the plurality of data blocks for defining positions of the plurality of data blocks,
    wherein one of the second positioning points is defined as a second direction identification point which indicates an identification direction of the two-dimensional optical identification code.

2. The device as claimed in claim 1, wherein the plurality of second positioning points include N second positioning points and the second direction identification point; the N second positioning points form an L shape, and the second direction identification point is located on a position with a first offset from an intersection of two lines of the L shape, where N is a positive integer.

3. The device as claimed in claim 2, wherein, in the N second positioning points, I second positioning points define I first-direction virtual lines, and J second positioning points define J second-direction virtual lines, each data block being centered at an intersection of a first-direction virtual line and a second-direction virtual line, where I, J are positive integers and I+J=N.

4. The device as claimed in claim 3, wherein the first-direction virtual lines are vertical to the second-direction virtual lines.

5. The device as claimed in claim 3, wherein the data block is partitioned into the plurality of virtual areas by the first-direction virtual lines and the second-direction virtual lines.

6. The device as claimed in claim 5, wherein the plurality of virtual areas include four virtual areas.

7. The device as claimed in claim 6, wherein each data block includes four defined patterns disposed in the four virtual areas, respectively, and only one of the four defined patterns is filled up.

8. The device as claimed in claim 7, wherein the defined pattern filled up indicates two-bit binary code including 00, 01, 10, and 11.

9. The device as claimed in claim 8, wherein the define pattern is a circle or a square.

10. A decoding method for quickly decoding two-dimensional optical identification code, the two-dimensional optical identification code including a first positioning block, a plurality of data blocks, and a second positioning block, the first positioning block having a plurality of first positioning points and the plurality of first positioning points including five first positioning points, in which four first positioning points are located on four corners of a virtual square and one first positioning point is located on a center of the virtual square, the plurality of data blocks being placed around the first positioning block, each of the data blocks having a plurality of defined patterns selectively positioned in one of a plurality of virtual areas produced by equally dividing the data block, the second positioning block having a plurality second positioning points and being placed at two adjacent boundaries of the plurality of data blocks for defining distributed locations of the data blocks, the method comprising the steps of:
    (A) finding the plurality of first positioning points of the first positioning block;
    (B) calculating the plurality of second positioning points of the second positioning block based on the plurality of first positioning points;
    (C) recognizing a second direction identification point among the plurality of second positioning points;
    (D) determining an identification direction of the optical identification code with same gray level, and storing coordinates of the first and second positioning points;
    (E) finding any first positioning block that includes the first positioning points;
    (F) searching for a plurality of data blocks on the first positioning block found in step (E), so as to find an area with complete plurality of data blocks and corresponding first positioning block;
    (G) calculating offsets of defined patterns of the complete plurality of data blocks in the area found in step (F);
    (H) regarding the corresponding first positioning block as illegal when an offset is greater than a threshold; and
    (I) outputting data corresponding to a smallest offset of the defined patterns when the offsets of the defined patterns are smaller than or equal to the threshold.

* * * * *